(12) United States Patent
Bailey et al.

(10) Patent No.: US 6,381,920 B1
(45) Date of Patent: May 7, 2002

(54) PACKAGING MACHINE WITH ROTARY WRAPPING ASSEMBLY (75) Inventors: Thomas William Bailey; Andrew John Cleall, both of Coventry; Graham Richard James; Robert Howard Taylor, both of Bucks, all of (GB)

(73) Assignee: Molins PLC, Milton Keynes (GB)

( * ) Notice: Subject to any disclaimer, the term of this patent is extended or adjusted under 35 U.S.C. 154(b) by 0 days.

(21) Appl. No.: 09/319,134

(22) PCT Filed: Dec. 10, 1997

(86) PCT No.: PCT/GB97/03398

§ 371 Date: Jun. 2, 1999

§ 102(e) Date: Jun. 2, 1999

(87) PCT Pub. No.: WO98/25826

PCT Pub. Date: Jun. 18, 1998

(30) Foreign Application Priority Data

Dec. 10, 1996 (GB) .............................................. 9625588

(51) Int. Cl.[7] .............................................. B65B 49/00
(52) U.S. Cl. .............................. 53/234; 53/225; 53/228; 53/232; 53/233
(58) Field of Search .......................... 53/234, 233, 232, 53/148, 228, 151, 124, 37, 225

(56) References Cited

U.S. PATENT DOCUMENTS

| 3,579,952 A | * | 5/1971 | Robert et al. .................. 53/151 |
| 5,611,191 A | * | 3/1997 | Bailey et al. .................. 53/151 |
| 5,755,080 A | * | 5/1998 | Draghetti et al. .............. 53/234 |
| 5,771,666 A | * | 6/1998 | Bertuzzi et al. ............... 53/234 |
| 6,006,492 A | * | 12/1999 | Draghetti ...................... 53/151 |

FOREIGN PATENT DOCUMENTS

GB          2063811      *   6/1981

* cited by examiner

Primary Examiner—Rinaldi I. Rada
Assistant Examiner—Sam Tawfik
(74) Attorney, Agent, or Firm—Antonelli, Terry, Stout & Kraus, LLP (57) ABSTRACT A packing machine comprising a rotary assembly (2) which is adapted to receive articles (4) travelling along a path which is adjacent one region of the periphery of the assembly, and means (26) for receiving foil (14) or other wrapping material, at a different peripheral region, the foil then being oriented in a tangential plane; the assembly further comprising means for reorienting the foil into a plane which is perpendicular to said tangential plane (20) at a subsequent rotary position, where it is suitably aligned with a cooperating article wrapping means (40, 32).

12 Claims, 11 Drawing Sheets

PACKAGING MACHINE WITH ROTARY WRAPPING ASSEMBLY

BACKGROUND OF THE INVENTION

This invention relates to packing machines, for packing or wrapping articles and particularly to a packing machine for an article or bundle of articles which is to be wrapped in a wrapping material, hereinafter referred to generally as foil, ready for insertion into a container.

Where large numbers of articles are being produced at high speed, and are required to be packed into containers, it is desirable for the packing process to be carried out as quickly and smoothly as possible, without too many interruptions to the flow of articles. The speed of such operation is, however, generally restricted by the need to perform certain operations with the mechanism stationary, particularly when two separate elements making up the final package are brought together.

One example of a prior type of machine in which a specific effort has been made to overcome such problems, is described in U.S. Pat. No. 3,579,952, which is designed to pack articles such as cigarettes supplied in a continuous stream to an upper layer, whilst open ended packets are formed at a bottom layer, and in which a middle layer contains a mechanism which pushes the bundles into the packet, closes them and delivers them in one continuous stream. The machine is designed to rotate continuously about a vertical axis past a continuous supply of cigarettes and a continuous supply of each of the packing materials. However, known machines of this kind suffer from considerable complexity, particularly because there are a large number of radially reciprocating parts in the construction, and this will necessarily place an upper limit on the possible speed of operation of the machine.

SUMMARY OF THE INVENTION

In a preferred form of the invention, the machine comprises a rotary assembly which is adapted to receive articles travelling along a path which is adjacent one region of the periphery of the assembly, and means for receiving foil or other wrapping material, at a different peripheral region, the wrapper then being oriented in a tangential plane; the assembly further comprising means for reorienting the wrapper into a plane which is perpendicular to said tangential plane at a subsequent rotary position, where it is suitably aligned with a cooperating article wrapping means.

Preferably the perpendicular plane is a packing machine in which the perpendicular plane is also perpendicular to the axis of the assembly.

Preferably the means for receiving the wrapper comprises a pad having an aperture, the pad being pivotable to a position in which the aperture is aligned with a wrapper forming pocket, and at which articles are passed through the aperture to pick up the wrapper and carry it into the pocket.

Preferably, the rotary mechanism comprises a plurality of article wrapping stations, each comprising a wrapper forming pocket having an entry aperture which, in its operative position, is axially aligned with the aperture in a corresponding wrapper receiving pad, and an exit aperture from which the folded wrapper article is ejected.

Preferably the folded foil bundle is then received in a further former device and the wrapper forming pocket is then arranged to be moved to a position in which it is clear of the entry of the further former device, to allow the trailing end of the wrapped article to be engaged by suitable closure means. In a preferred arrangement, the wrapper receiving pad and the forming pocket are arranged to pivot between the required positions as they rotate around the drum by means of linkages connected to a crankshaft.

The invention also extends to a packing machine comprising a rotary assembly, said assembly including means for receiving a wrapper oriented in a substantially tangential plane at a first rotary position of the assembly, means for reorienting the wrapper at a second rotary position, into a plane which is substantially perpendicular to the axis of the assembly, means for advancing an article to be wrapped in an axial direction so as to intercept a wrapper in said perpendicular plane and become partially wrapped therein, and means for receiving said partially wrapped article.

Accordingly, the present invention may be used in a packing machine which is adapted to work on a continuous basis, and can readily be adapted for dealing with articles or materials of widely diverse character, which operates to insert articles into containers whilst the containers and the articles are moving in concert with one another.

BRIEF DESCRIPTION OF THE DRAWINGS

One embodiment of the invention will now be described by way of example, with reference to the accompanying drawings in which.

DETAILED DESCRIPTION OF THE INVENTION

Figure 1:
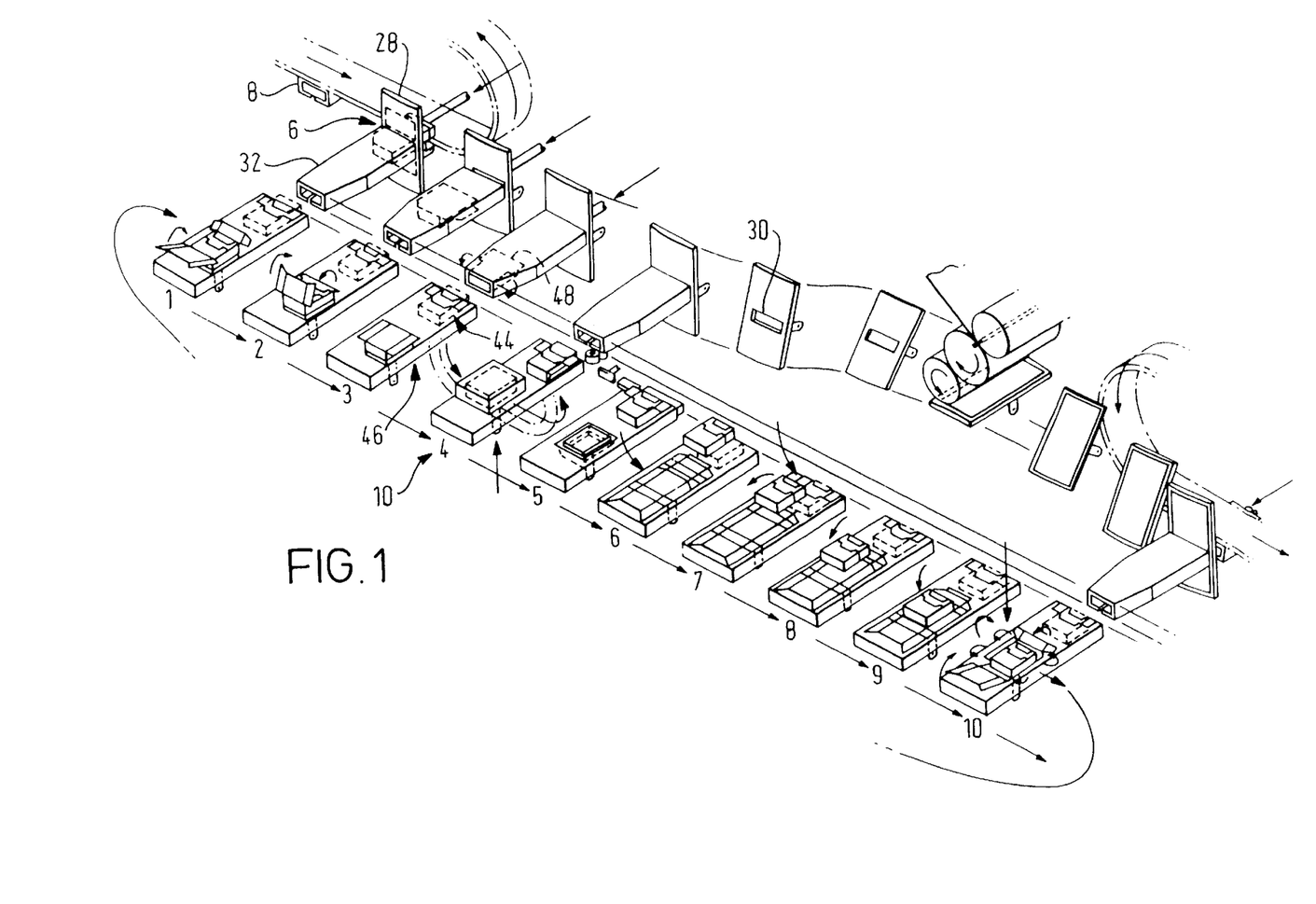
FIG. 1 is a material flow schematic of an apparatus according to the invention, illustrating the path of products through the process.
Figure 2:
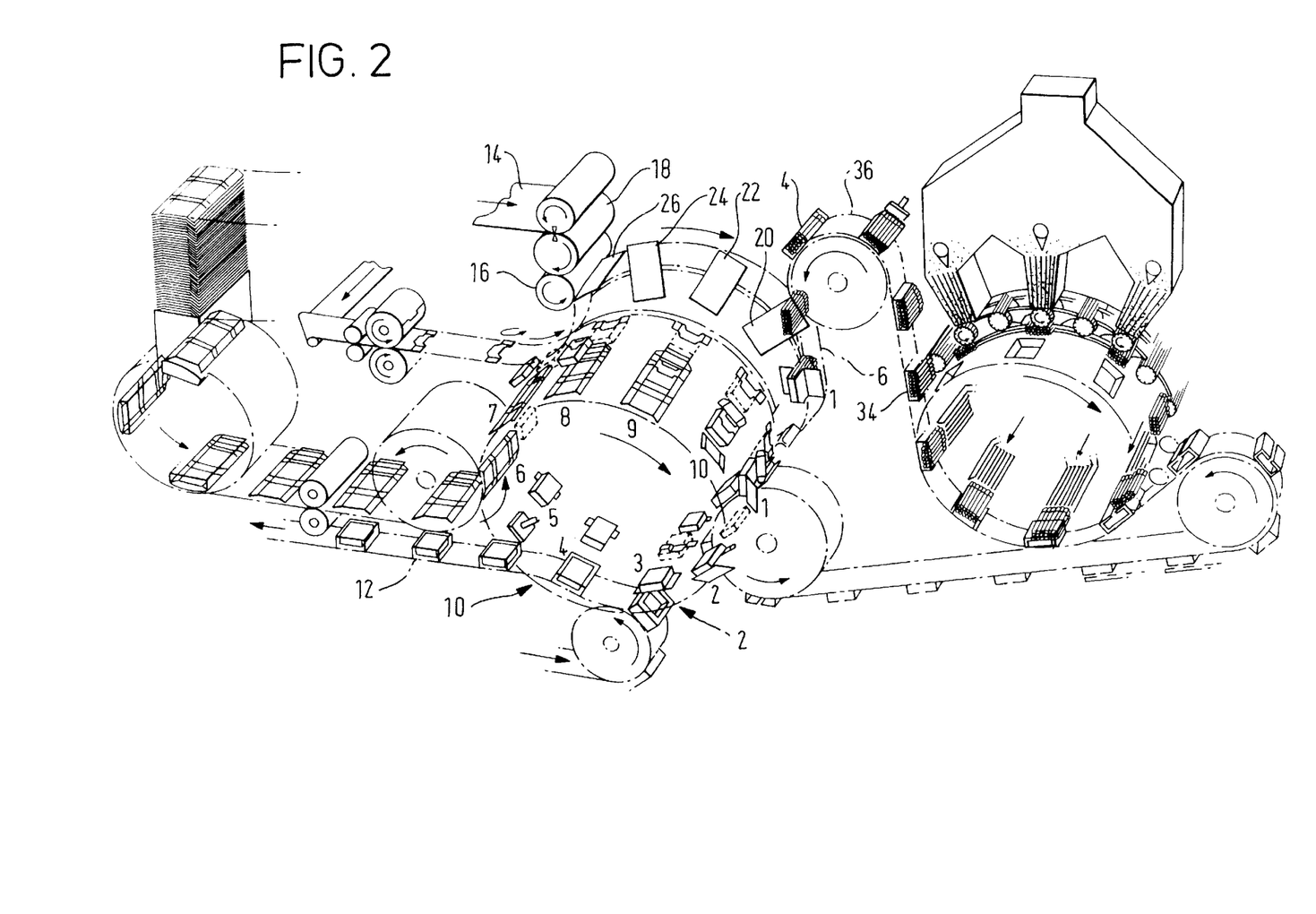
FIG. 2 is a schematic perspective view of the apparatus, illustrating the motion of the main parts.

Referring firstly to FIGS. 1 and 2, the apparatus comprises a rotating drum 2 which receives groups 4 of articles to be packaged at a first peripheral region 6 of the drum, the articles, in this case cigarettes, being conveyed in pockets 8 on a conveyor. As shown, this conveyor passes close to one peripheral edge of the drum, as described in more detail with reference to FIG. 6 below; and during processing, the articles will be moved in an axial direction, whilst they are being carried around the drum, in the order indicated by the station numbers 1–10 with the assembled packages leaving the drum approximately one third of the way round the drum at region 10, and from the opposite peripheral edge of the drum assembly. The articles are then conveyed away from the drum by a further conveyor 12.

FIG. 2 also illustrates schematically the arrangement for receiving and manipulating the foil which is to be used in wrapping the articles, and as shown, a web of foil 14 is fed in known fashion onto a receiving roller 16, on which pre-cut sections 18 are held in position by suction, for successive transfer onto foil receiving pads 20, 22, 24, 26 etc.

Figure 3:
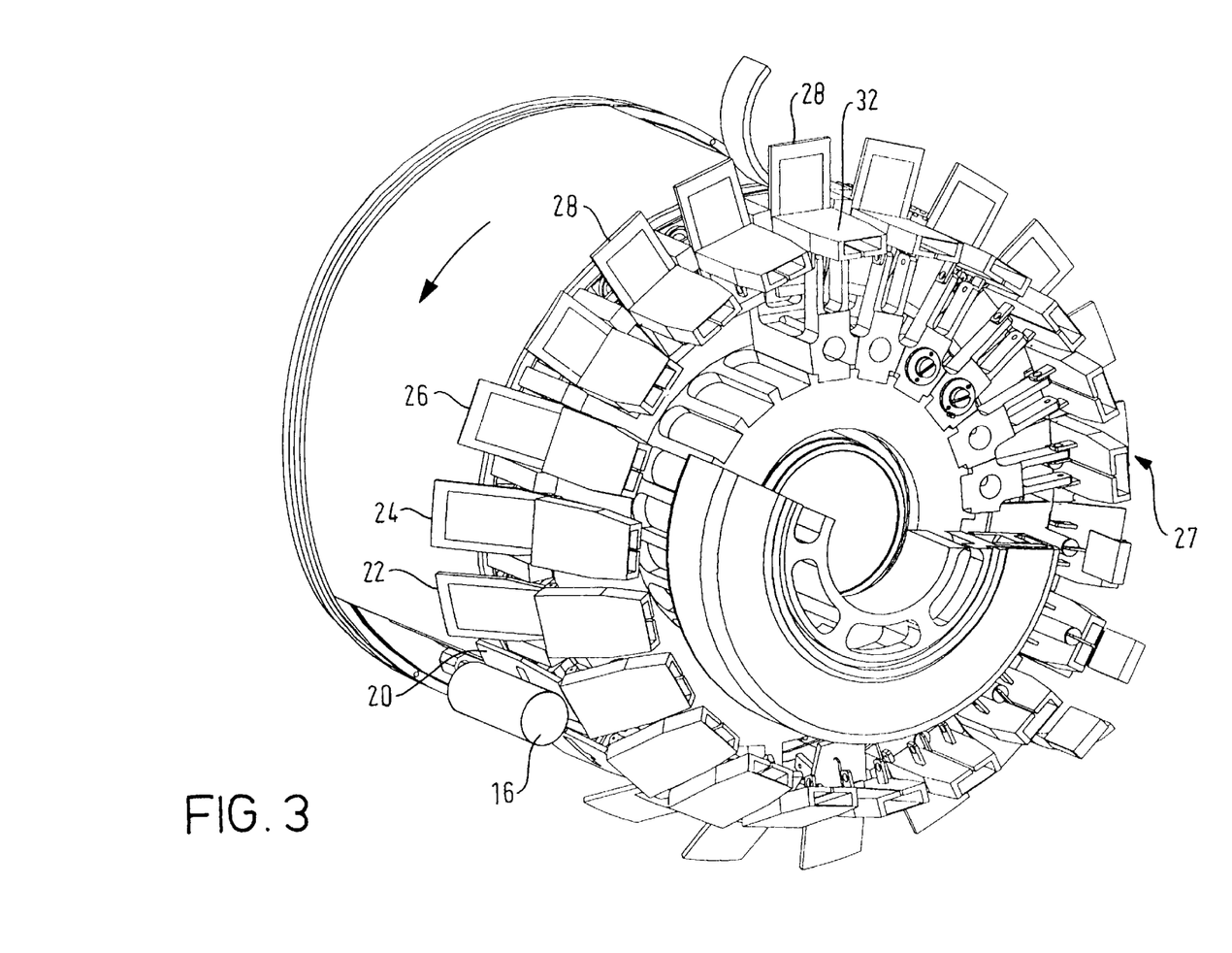
FIG. 3 is a more detailed perspective view of the drum and forming pockets of FIG. 2.

As shown in FIG. 2, the drum 2 is rotating in a clockwise direction, so that the successive foil receiving pads 20, 22, 24 etc pass the foil receiving position, and the mechanism is so arranged that, as each foil receiving pad approaches the receiving position, it is tilted downwards from a previously radially extending orientation (not shown) until it reaches the tangentially oriented position 26 for alignment with the roller 16. As the rotation continues the pads are progressively returned to the radially extending position 20 ready to co-operate with incoming groups of articles at the region 6 of the drum. The various orientations of the pads are seen from the other side of the drum in the more detailed perspective view of FIG. 3. As an alternative, the foil may be rotated through 90° about an axis parallel to the drum axis so that it then lies in a radial plane, which will of course imply corresponding changes in orientation of the mechanism at region 6 and subsequent stages.

Each foil receiving pad has a central aperture 30 (FIG. 1), and in the radially oriented position 28, (FIGS. 1 and 3), the aperture is aligned with the entry aperture of a corresponding foil forming pocket 32.

Figure 4:
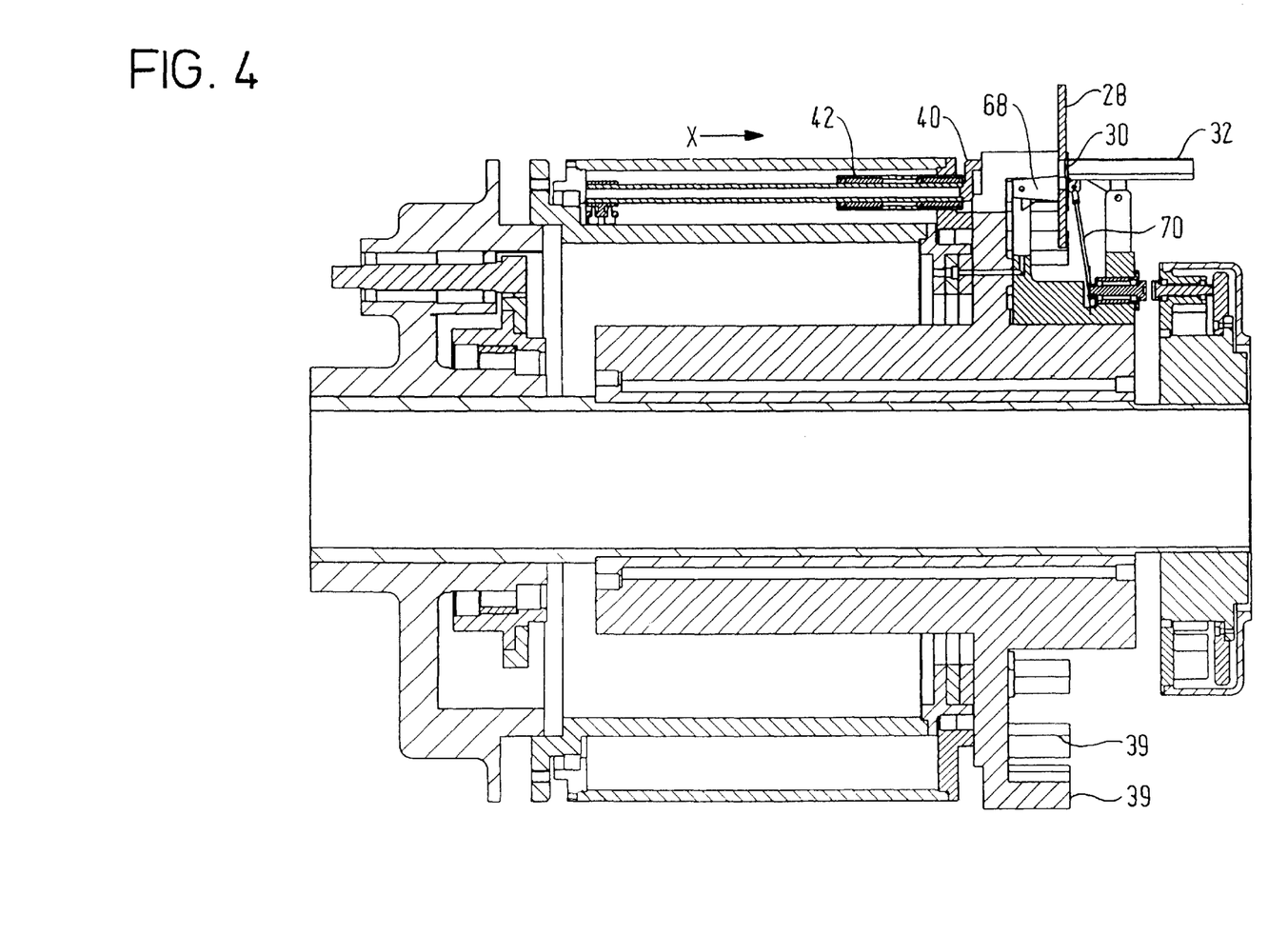
FIG. 4 is a radial cross-section of the drum of FIG. 3.
Figure 7:
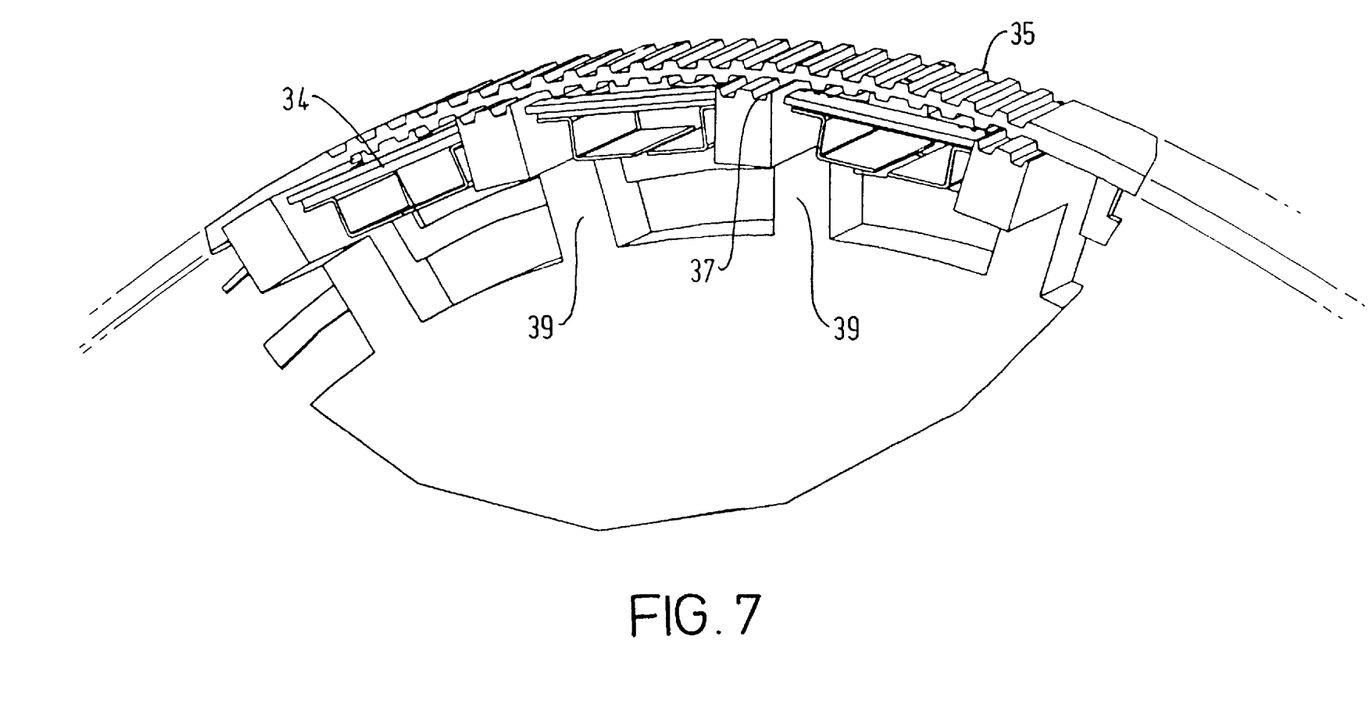
FIG. 7 is a partial perspective view showing the co-operation between the drum and its input conveyor.

At this position each incoming bundle of articles is aligned with the aperture 30 of the foil receiving pad 28, whilst it is in the radially oriented position described above and as illustrated in more detail in the cross-sectional view of FIG. 4. As shown in FIG. 7, the collation pockets 34 carrying the incoming bundles are carried on a toothed belt 35 which co-operates with corresponding teeth 37 formed on radial projections 39 of the drum 2. As the belt approaches, the drum the pockets are interposed between the projections 39 so as to be aligned with a pusher 40, mounted on a reciprocating carriage assembly 42 which is movable in the axial direction as indicated by the arrow X in FIG. 4.

Transfer of an incoming bundle of articles to the drum 2 need not be by way of the pocketed belt 35. In particular, an axially offset pocketed drum may be provided to transfer bundles.

Figure 5:
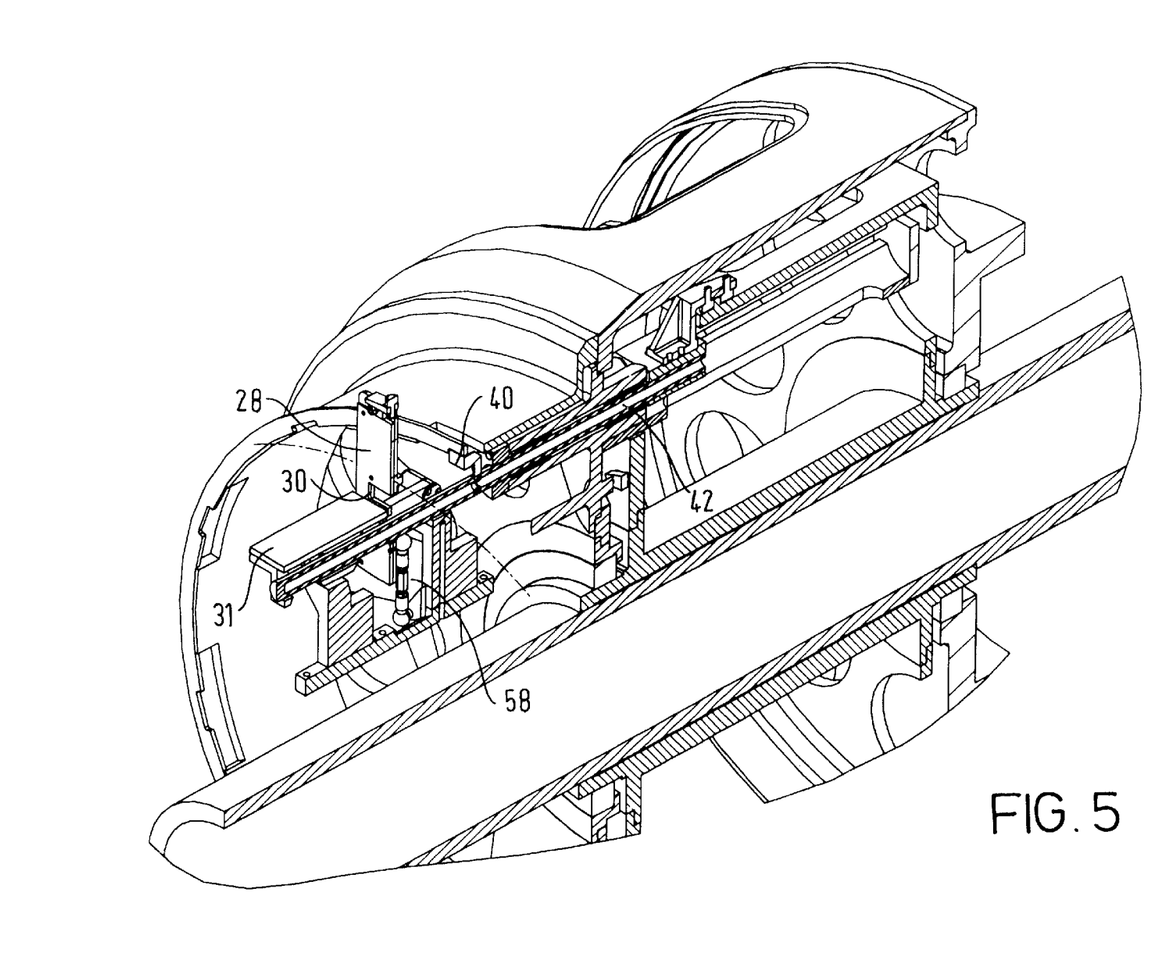
FIG. 5 is an enlarged perspective cross-section of a preferred alternative form of the foil pad mechanism.
Figure 6:
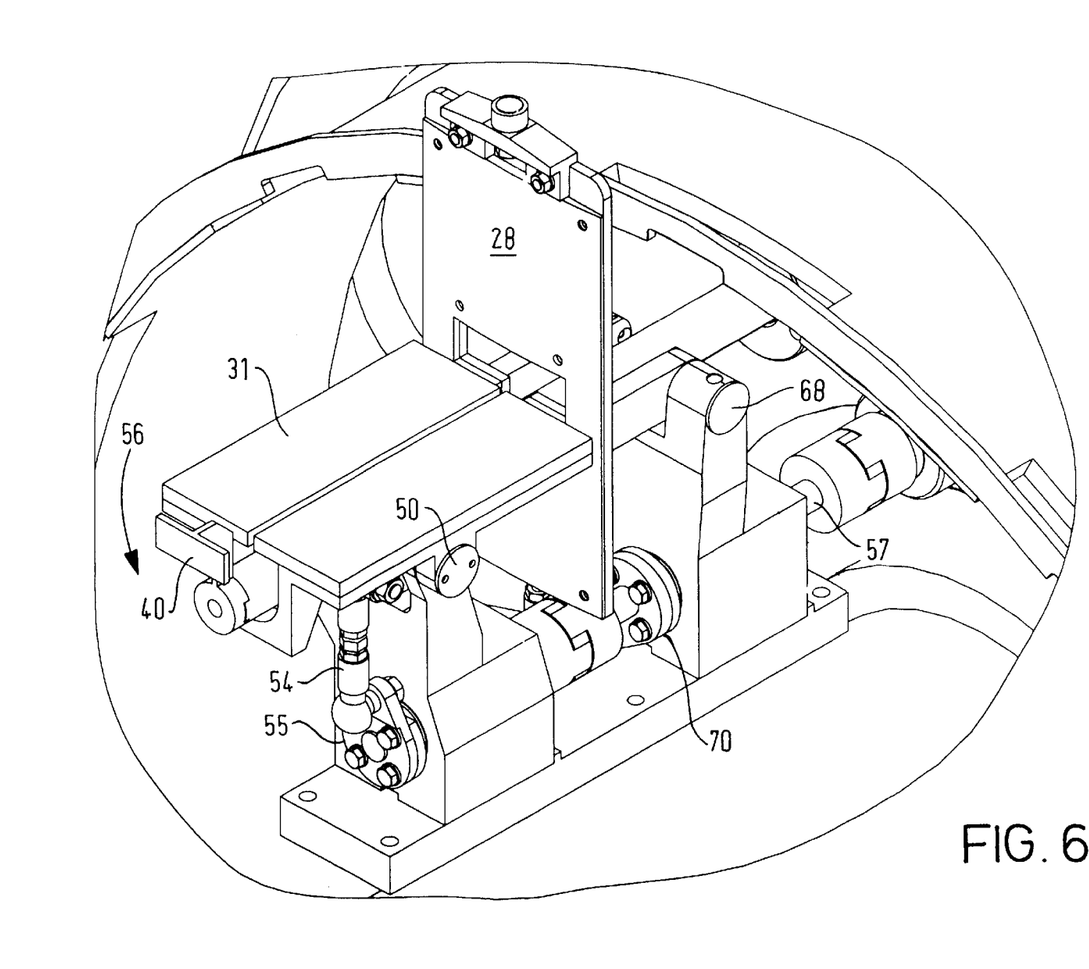
FIG. 6 is a further enlarged perspective view of the mechanism of FIG. 5.
Figure 6A:
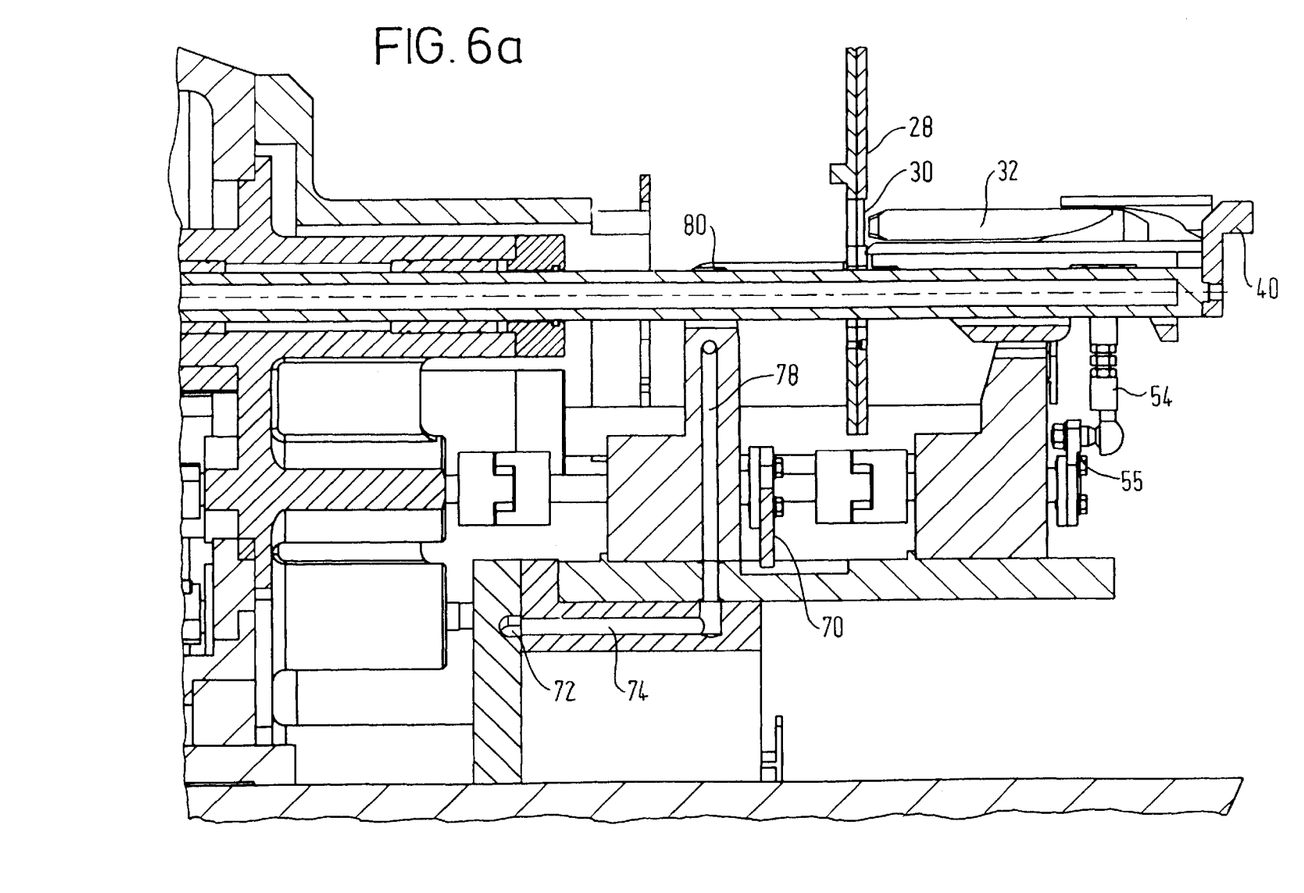
FIG. 6a is an axial cross-section through the mechanism of FIG. 6.

The pocketed belt arrangement is more clearly illustrated in the embodiment of FIGS. 5 and 6. In this position, the bundle of articles is aligned with the aperture 30 of the foil receiving pad 28, whilst the foil 18 is held on the outer surface by suction. FIGS. 6 and 6a also show the pivotal mounting 68 of the foil receiving pad. When the mounting 31 of the foil former pocket 32 is axially oriented, the pocket entry is aligned with the exit of the aperture 30, and the exit of the foil former pocket will then be aligned with the entry of a receiving pocket 44 (see FIG. 1). Thus, in operation, when the pusher 40 is actuated, starting from the axially inward position of FIG. 5 the bundle of articles 34 is pushed through the aperture 30, carrying the foil 18 into the foil former pocket 32 so that it is folded around the bundle, and passes into the receiving pocket. The pusher then occupies the outward position of FIG. 6. From this position, the wrapped bundle will be transferred after closure is completed (see below) to a position in which it engages with a waiting packet, for example as shown at 46 in FIG. 1.

Figure 6B:
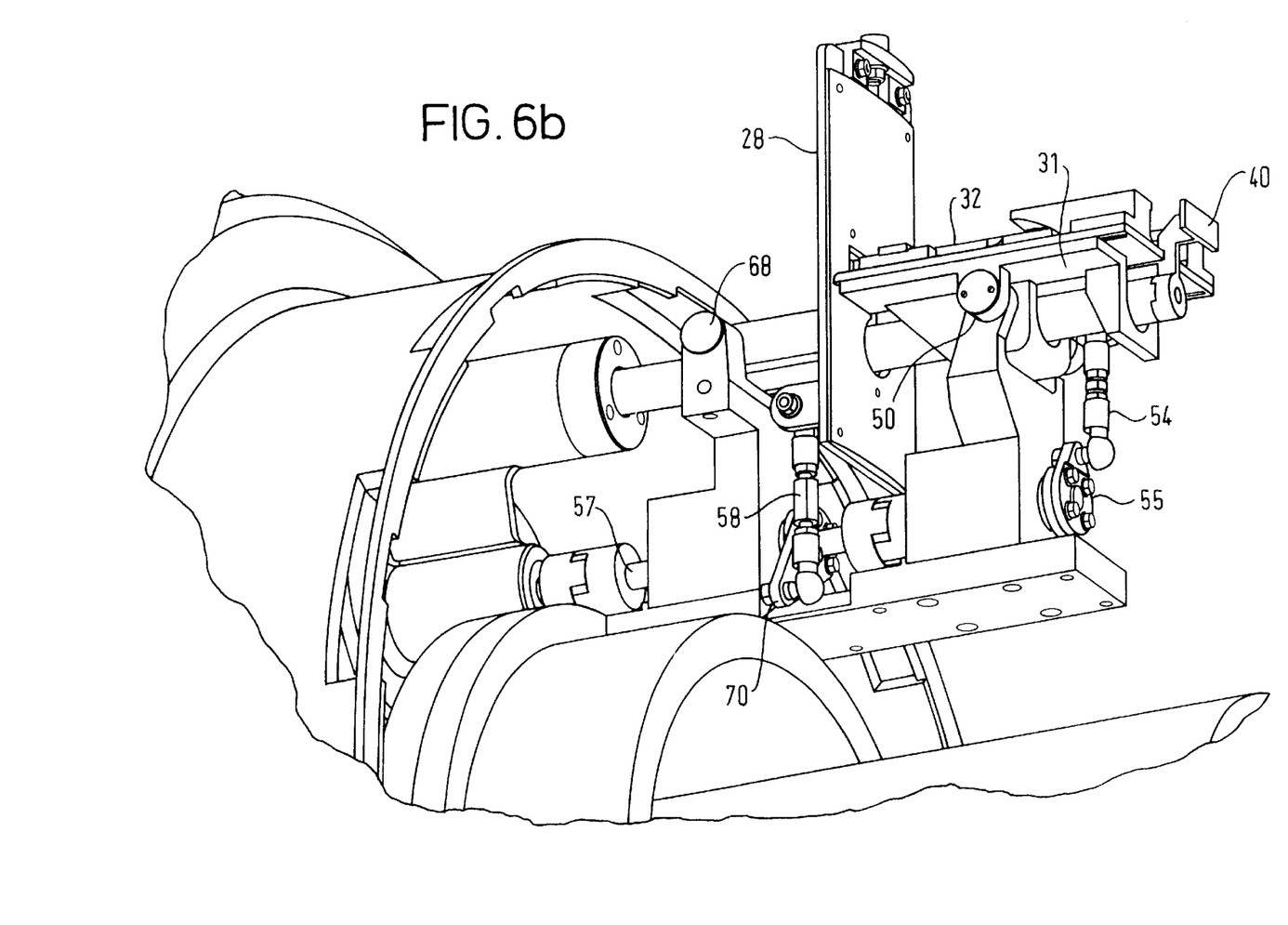
FIG. 6b is an underneath perspective view of the mechanism of FIG. 6.

It will be appreciated that, when the initially wrapped bundle is received in the receiving pocket 44, the trailing end 48 will still be open, and must be folded around the end of the bundle. Thus it is then necessary for the end to be engaged by foil closure tooling, and to achieve this it is necessary to move the foil former pocket 32 so as to clear the trailing end 48. As illustrated in the arrangement of FIGS. 6, 6a and 6b the foil former pocket mounting 31 is pivotally mounted at 50, onto the support drum, and is connected by a connecting rod 54 to a rotatable crank 55 mounted on a crankshaft 57. Thus, after the pusher 40 has been retracted, the crank 55 rotates to cause the former pocket mounting 31 to be tilted downwardly in the direction 56 so as to clear the end 48 of the open package.

The tilting movement of the foil pad 28 is achieved as shown in FIGS. 5 and 6b by means of a further connecting rod 58, which is similarly actuated by means of a further crank arm 70.

FIG. 6a also illustrates how the supply of vacuum is connected to the foil pad 28, in order to enable it to pick up and release the foil. As illustrated in the drawing, a vacuum inlet 72 communicates with an axial passage 74 in the drum, and the passage 74 is in turn connected by means of a radial passage 78 to a rotary union 80 in the pivot 68. A drilled port 82 connects this union to the body of the foil plate 28, as shown in detail in the enlarged view of FIGS. 8 to 10.

Figure 8:
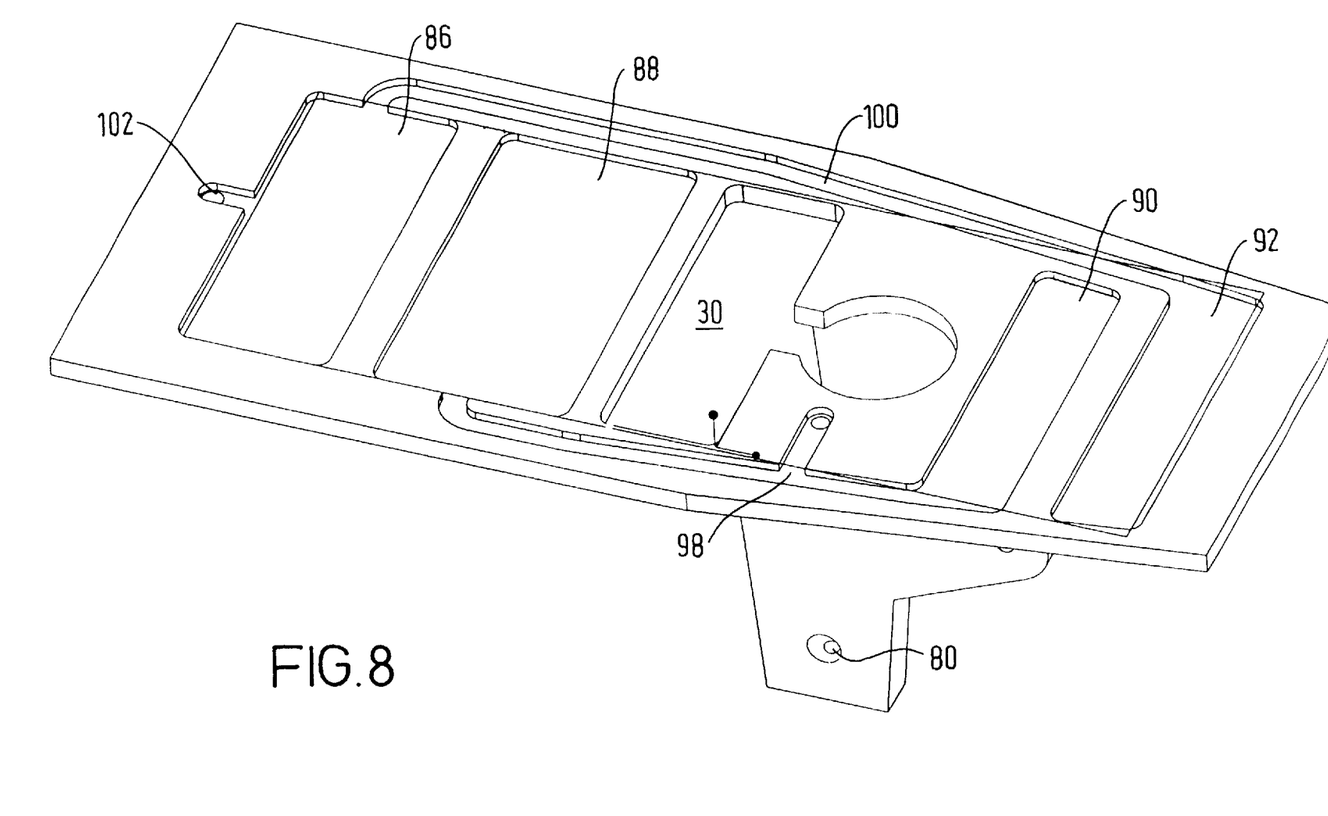
FIG. 8 is an enlarged perspective view of a foil pad.
Figure 9:
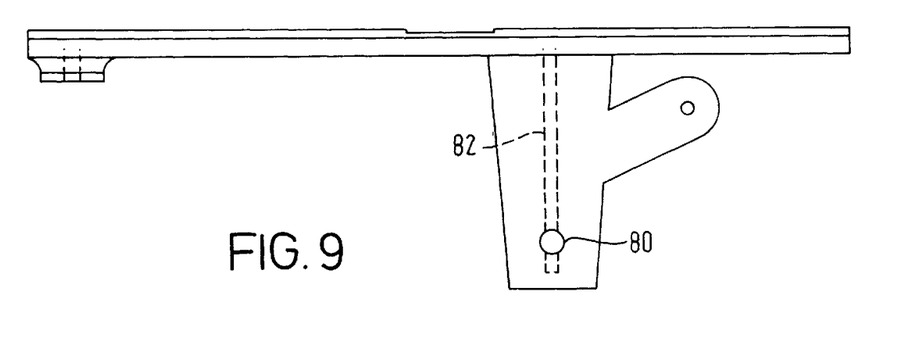
FIG. 9 is a side view of the foil pad of FIG. 8.
Figure 10:
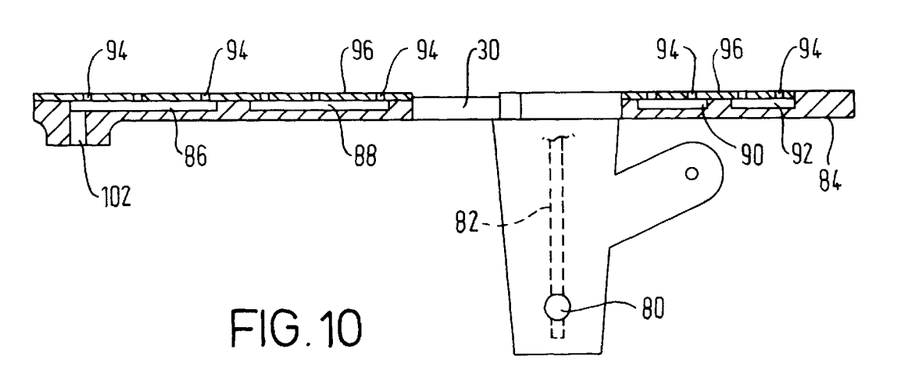
FIG. 10 is a partly sectional view of the foil pad of FIG. 8.

As best seen in FIGS. 8 and 10, the foil pad 28 is of a laminated construction, the main body 84 being cut away and recessed so as to provide the central aperture 30, and four vacuum cavities 86, 88, 90 and 92, each of which communicates with the foil receiving face of the pad, via suction ports 94 formed in a cover plate 96.

As best seen from FIG. 8, the two vacuum cavities 88 and 90 are both connected to the vacuum passage 82 by means of the cut away 98, whilst the two cavities 86 and 92 are connected by a passage 100, with the cavity 86 being connected to a separate vacuum source by means of port 102. This allows for independent control of the suction at the outer ends of the foil, via cavities 86 and 92, and the inner regions, via cavities 88 and 90. In this way, the pick up and release of the foil can be accurately controlled at the required stages of operation of the apparatus.

What is claimed is:

1. A packing machine comprising a rotary assembly which is adapted to receive articles traveling along a path which is adjacent one region of the periphery of the rotary assembly, and means for receiving a wrapper at a different peripheral region of the rotary assembly, the wrapper then being oriented in a plane tangential to the rotary assembly; the rotary assembly further comprising means for reorienting the wrapper into a plane which is perpendicular to said tangential plane at a subsequent rotary position of the rotary assembly, where it is suitably aligned with a cooperating article wrapping means, in which the means for receiving the wrapper comprises a pad having an aperture, the pad being pivotable to a position in which the aperture is aligned with a wrapper forming pocket, and at which an article is passed through the aperture to pick up the wrapper and carry it into the pocket.

2. A packing machine according to claim 1 in which the, perpendicular plane is also perpendicular to the axis of the rotary assembly.

3. A packing machine according to claim 1, in which the wrapper receiving pad and the forming pocket are arranged to pivot between required positions as they rotate around the rotary assembly by means of linkages connected to a crankshaft.

4. A packing machine comprising a rotary assembly which is adapted to receive articles traveling along a path which is adjacent one region of the periphery of the rotary assembly, and means for receiving a wrapper at a different peripheral region of the rotary assembly, the wrapper then being oriented in a plane tangential to the rotary assembly; the rotary assembly further comprising means for reorienting the wrapper into a plane which is perpendicular to said tangential plane at a subsequent rotary position of the rotary assembly, where it is suitably aligned with a cooperating article wrapping means, in which the rotary assembly comprises a plurality of article wrapping stations, each comprising a wrapper forming pocket having an entry aperture which, in its operative position, is axially aligned with an aperture in a corresponding wrapper receiving pad, and an exit aperture from which the wrapped article is ejected.

5. A packing machine according to claim 4 in which the wrapped article is received in a receiving pocket via a pocket entry, after ejection from the wrapper forming pocket, and the wrapper forming pocket is then arranged to be moved to a position in which it is clear of the pocket entry of the receiving pocket to allow a trailing end of the wrapper to be engaged by suitable closure means.

6. A packing machine according to claim 4 further comprising pocketed conveyor means for conveying successive articles to said article wrapping stations, and reciprocating pusher means arranged to plunge and article through the said entry aperture, into wrapper forming pocket.

7. A packing machine according to claim 6 in which the wrapper forming pockets are mounted on a drum and oriented in a tangential plane, relative to the drum, in the wrapping position, and the pusher is moved in an axial direction in the said plane.

8. A packing machine according to claim 7 in which the pad is pivotally mounted on the drum and moved between its operative positions by means of a crank operated mechanism geared to the drum.

9. A packing machine according to claim 8 in which the wrapper forming pockets are also pivotally mounted on the drum and arranged to be tilted clear of the trailing end of the wrapped article by means of a crank operated mechanism connected to the drum.

10. A packing machine comprising a rotary assembly, including means for receiving a wrapper oriented in a plane substantially tangential to the rotary assembly at a first rotary position of the rotary assembly, means for reorienting the wrapper at a second rotary position into a plane which is substantially perpendicular to the axis of the rotary assembly, means for advancing an article to be wrapped in a direction axial of the rotary assembly so as to intercept a wrapper in said perpendicular plane and become partially wrapped therein, and means for receiving said partially wrapped article, wherein the receiving means includes a support surface for the wrapper which is formed on a pad which is pivotable between said tangential and perpendicular planes on rotation of said rotary assembly and suction means for retaining the wrapper on said surface.

11. A packing machine according to claim 10 where said suction means includes means for supplying suction independently to different regions of said surface, whereby suction may be applied independently to different regions of a wrapper.

12. A packing machine according to claim 11 wherein said different regions correspond respectively to at least one inner and at least one outer region of a wrapper.

\* \* \* \* \*